United States Patent [19]

Henderson et al.

[11] Patent Number: 5,427,485

[45] Date of Patent: Jun. 27, 1995

[54] PIVOTING MOVABLE RAMP FOR TRANSPORTING VEHICLES

[76] Inventors: John W. B. Henderson; William M. D. Henderson, both of Paddock Cottage, Hythe Road, Smeeth Ashford Kent, TN256SP, England

[21] Appl. No.: 200,339

[22] Filed: Feb. 23, 1994

[51] Int. Cl.⁶ .............................................. B60P 3/08
[52] U.S. Cl. ........................................ 410/26; 410/24; 414/229; 403/350
[58] Field of Search ...................... 410/3, 4, 6, 15, 13, 410/24, 25, 26, 29, 29.1; 414/229, 230, 228; 403/348, 350, 383

[56] References Cited

U.S. PATENT DOCUMENTS

| | | | |
|---|---|---|---|
| 930,169 | 8/1909 | Exley | 403/350 |
| 2,060,027 | 11/1936 | Butterworth | 410/15 |
| 2,454,554 | 11/1948 | Garnett | 410/26 |
| 2,595,533 | 5/1952 | Mullen et al. | |
| 2,684,264 | 7/1954 | Demos | 410/29.1 X |
| 2,883,231 | 4/1959 | Dawson | 410/29.1 X |
| 3,104,127 | 9/1963 | Swartzwelder | 410/29.1 |
| 4,668,142 | 5/1987 | Fity et al. | 414/228 X |
| 5,069,573 | 12/1991 | Blake et al. | 403/350 X |

FOREIGN PATENT DOCUMENTS 466912 2/1969 Germany .............................. 414/229

Primary Examiner—Michael S. Huppert
Assistant Examiner—Stephen Gordon
Attorney, Agent, or Firm—J. Sanchelima

[57] ABSTRACT

A pivoting movable ramp for transporting and storing automobiles inside containers. A cross bar assembly is demountably engaged to an upright assembly. The upright assembly being supported by the floor of the container. A ramp assembly supports the weight of the vehicle which a user desires to store or transport. The ramp assembly being demountably engaged to the crossbar assembly by a locking assembly. The locking assembly comprising a channel and a circular bay. The circular bay journaling and securing the ramp assembly to the crossbar assembly and being set forward a predetermined angle relative to the perpendicular such that the locking assembly cannot be demounted from the crossbar assembly unless the rear end of the ramp assembly is raised above the horizontal the same predetermined angle, thereby allowing the locking assembly to disengage the crossbar assembly.

6 Claims, 5 Drawing Sheets

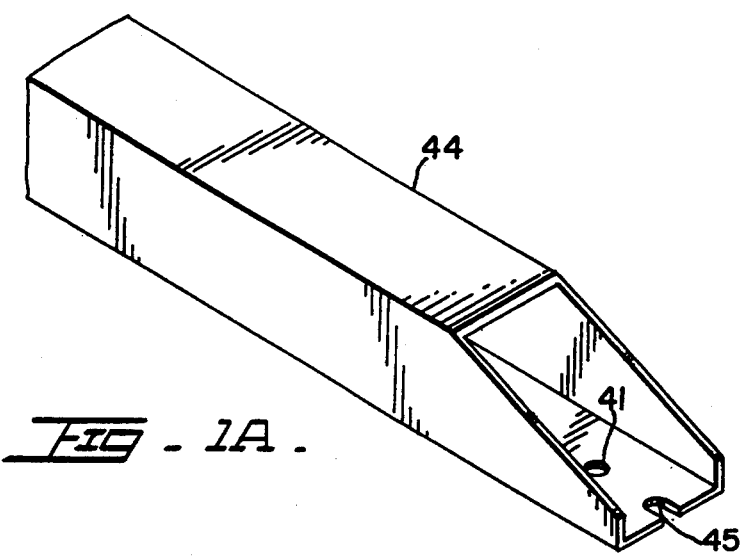
FIG-1A.
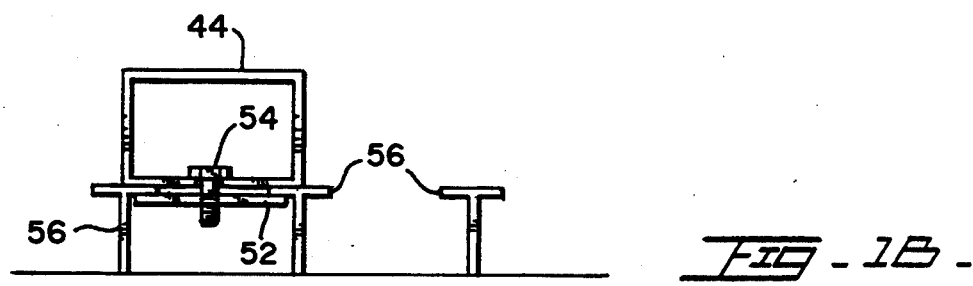
FIG-1B.
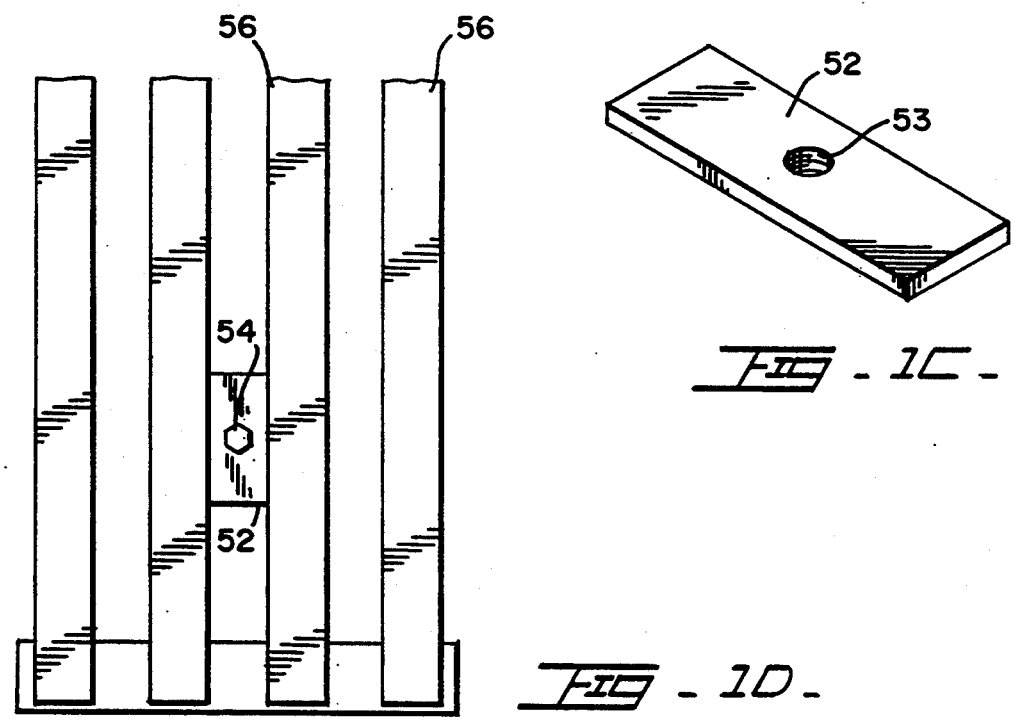
FIG-1C.
FIG-1D.

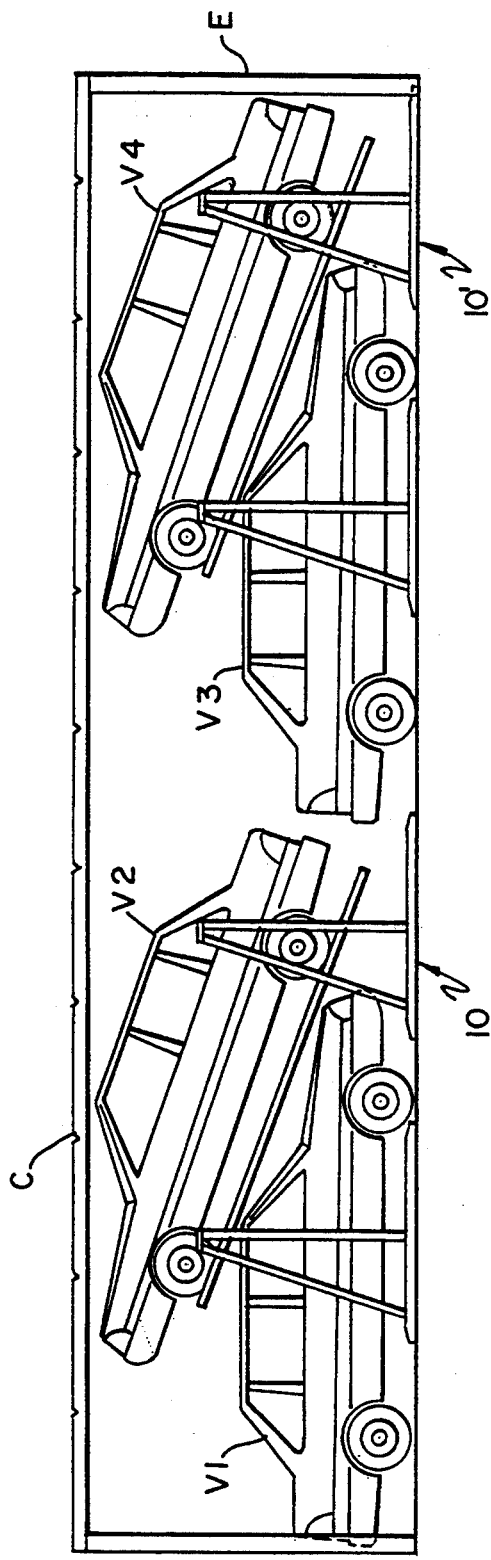
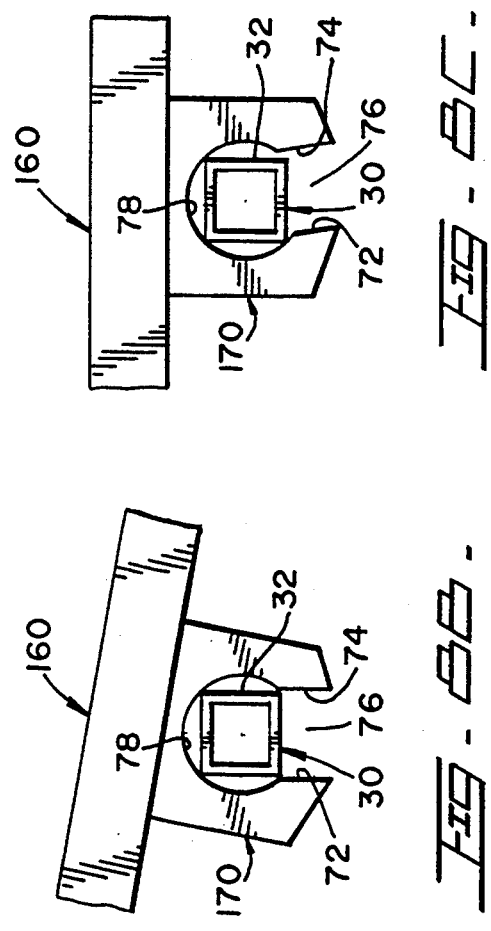
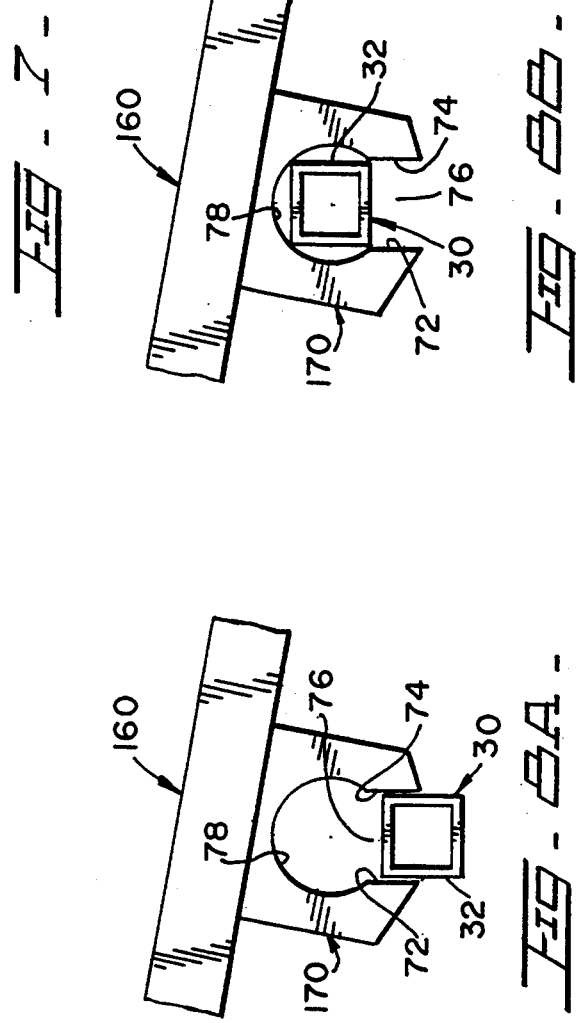

PIVOTING MOVABLE RAMP FOR TRANSPORTING VEHICLES

BACKGROUND OF THE INVENTION

1. Field of the Invention.

The present invention relates to an apparatus for storing and transporting automobiles in shipping containers, and more particularly, to an apparatus that is volumetrically efficient.

2. Description of the Related Art.

Applicant believes that the closest reference corresponds to U.S. Pat. No. 2,595,533 issued to Edward Mullen and John Boyko. Mullen teaches an apparatus for loading equipment that includes ramp members. However, it differs from the present invention because Mullen does not teach or disclose a device in which the ramps are removably secured to a horizontal upright and crossbar. Mullen also does not teach similar means for attaching the cross bar or ramp members to the upright assemblies that are found in the present invention.

Other patents describing the closest subject matter provide for a number of more or less complicated features that fail to solve the problem in an efficient and economical way. None of these patents, suggest the novel features of the present invention.

SUMMARY OF THE INVENTION

It is one of the primary objects of the present invention to provide a volumetrically efficient system for the transportation of automobiles.

It is another object of the present invention to provide an apparatus that can be readily assembled without requiring the use of additional accessories, fastening means or equipment.

It is still another object of this invention to provide a system which will prevent shipping damage to automobiles during transportation.

It is yet another object of this invention to provide such a device that is inexpensive to manufacture and maintain while retaining its effectiveness.

Further objects of the invention will be brought out in the following part of the specification, wherein the detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1A illustrates an detailed view of the base member of the upright assembly seen in FIG. 1.

FIG. 1B depicts a cut side view of the base member mounted to T-bars.

FIG. 1C illustrates an isometric view of the plate seen in FIG. 1B

FIG. 1D represents a top view of the plate seen in FIG. 1B and 1C and mounted in the same relative position to the T-bars in FIG. 1B.

FIG. 7 is a side elevational view of the present invention assembled inside a container to transport vehicles.

FIG. 8A is a partial cross-sectional view of the locking assembly positioned so that the channel can engage the crossbar assembly.

FIG. 8B is a partial cross-sectional view of the locking assembly in FIG. 8A such that the crossbar assembly has entered the bay of the locking assembly.

FIG. 8C is a view as in FIG. 8B such that the ramp assembly has been rotated below the horizontal and the locking assembly is fully engaged to the crossbar assembly.

DETAILED DESCRIPTION OF THE PREFERRED EMBODIMENT

Figure 1:
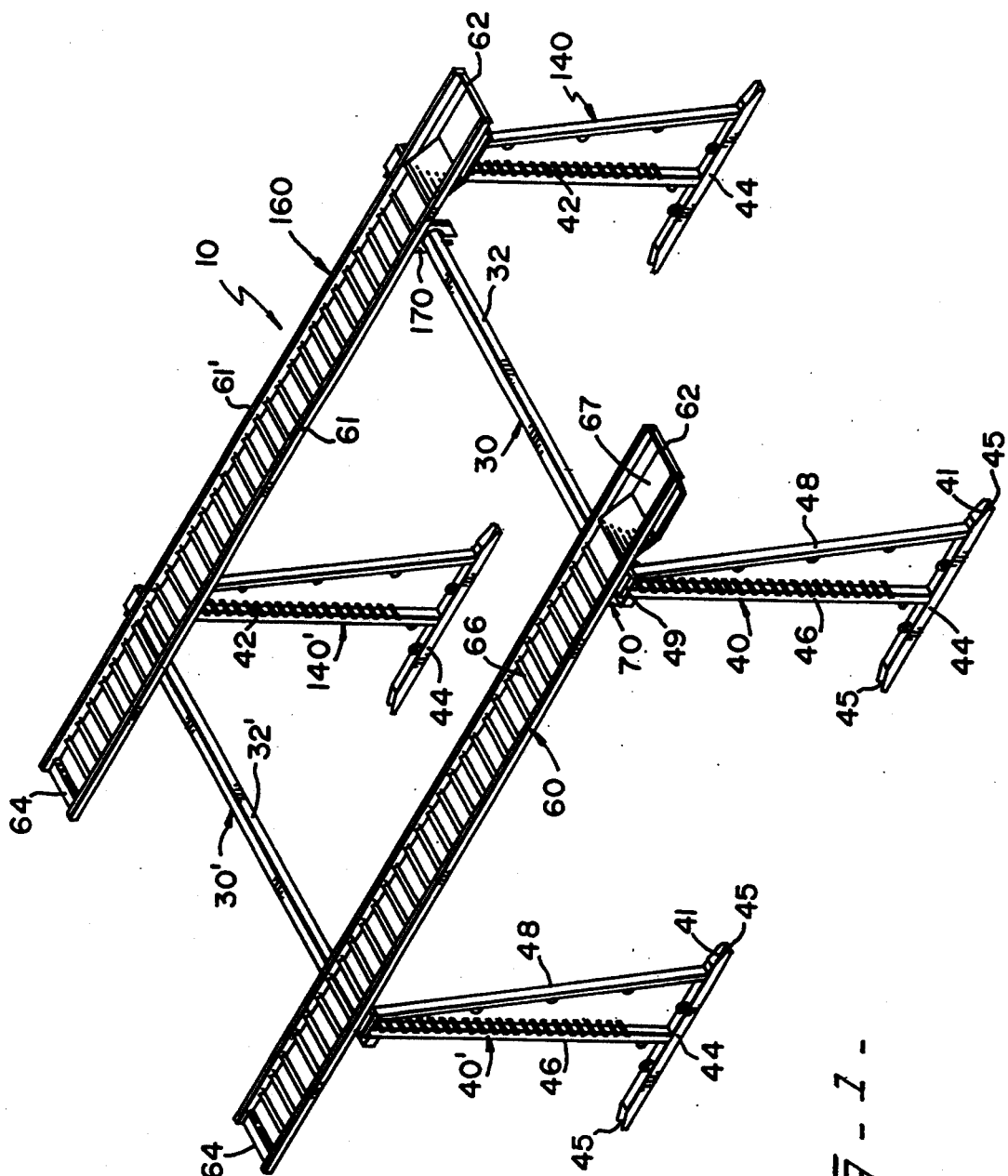
FIG. 1 represents an isometric view of the present invention.

Referring now to the drawings, where the present invention is generally referred to with numeral 10, it can be observed that it basically includes ramp assemblies 60 and 160, crossbar assemblies 30 and 30', locking assemblies 70 and 170 and upright assemblies 40; 40'; 140 and 140'. Each of these assemblies are removably mounted to each other.

In the past, empty shipping containers would typically be returned to their points of origin empty. This was particularly true with respect to refrigerated shipping containers which had transported fruit to the United States from South and Central America. For the purposes of the present application, shipping containers are not limited to containers transported by ships, but can also include shipping containers transported by rail ship, aircraft, motor vehicle or other means for moving cargo. The present invention allows a user to transport automobiles in shipping containers that would otherwise be repositioned, or returned to their: point of origin, partially or completely empty. In the case of non-refrigerated shipping containers, the present invention permits a user to increase the number of vehicles that may be transported within a single container.

Referring now to FIGS. 1; 2 and 3, it can be seen that upright assembly 40 (and also assemblies 140; 40' and 140') includes base member 44, vertical upright member 46, angular member 48, top brace 49 and protruding pins 42.

In the preferred embodiment, base member 44 is an elongated member having a sufficient longitudinal surface that comes in contact with the supporting ground so as to provide the necessary structural stability. Upright member 46 is rigidly and perpendicularly mounted to base member 44 and extends upwardly a predetermined distance. Similarly, angular member 48 is also rigidly mounted at one end to base member 44 and extends a predetermined distance upwardly at an angle with respect to base member 44. In addition, upright member 46 has protruding pins 42 rigidly mounted thereon and spaced at regular intervals. Brace member 49 connects the uppermost ends of members 46 and 48. In the preferred embodiment, several tie-down loops 43 are integral with upright assembly 40 and allow a user to secure the vehicle being transported on device 10. As best seen in FIG. 1A, base member 44 of upright assembly 40 has holes 41 and slots 45 therethrough. Holes 41 and slots 45 allow a user, in conjunction with fastening members, to fasten upright assembly 40 to the floor of a typical shipping container. When device 10 is being utilized to transport vehicles in a refrigerated shipping container, holes 41 are used in conjunction with plates 52 and bolts 54 to fasten base 44 to T-bars 56. In a typical refrigerated shipping container T-bars 56 run longitudinally along the length of the interior of the container.

Referring now to FIGS. 1A, 1B, 1C and 1D, it can be seen that when device 10 is positioned in a refrigerated shipping container that T-bars 56, which typically form the floor of a refrigerated container, necessitate an alternative embodiment to secure base 44 to the floor of a shipping container having T-bars 56. It is apparent from FIG. 1B that hole 41, plate 52 and bolt 54 cooperatively secure base 44 in position and that plate 52 has sufficient width to extend transversally between two T-bars 56. This permits plate 52 to be inserted between two T-bars 56 and then rotated such that plate 52 is transversally positioned between two T-bars 56, as seen in FIG. 1D. Plate 52, best seen in FIG. 1C, has opening 53 therethrough. Bolt 54 passes through base 44, hole 41 and opening 53 and secures base 44 to the floor of the shipping container.

Figure 5:
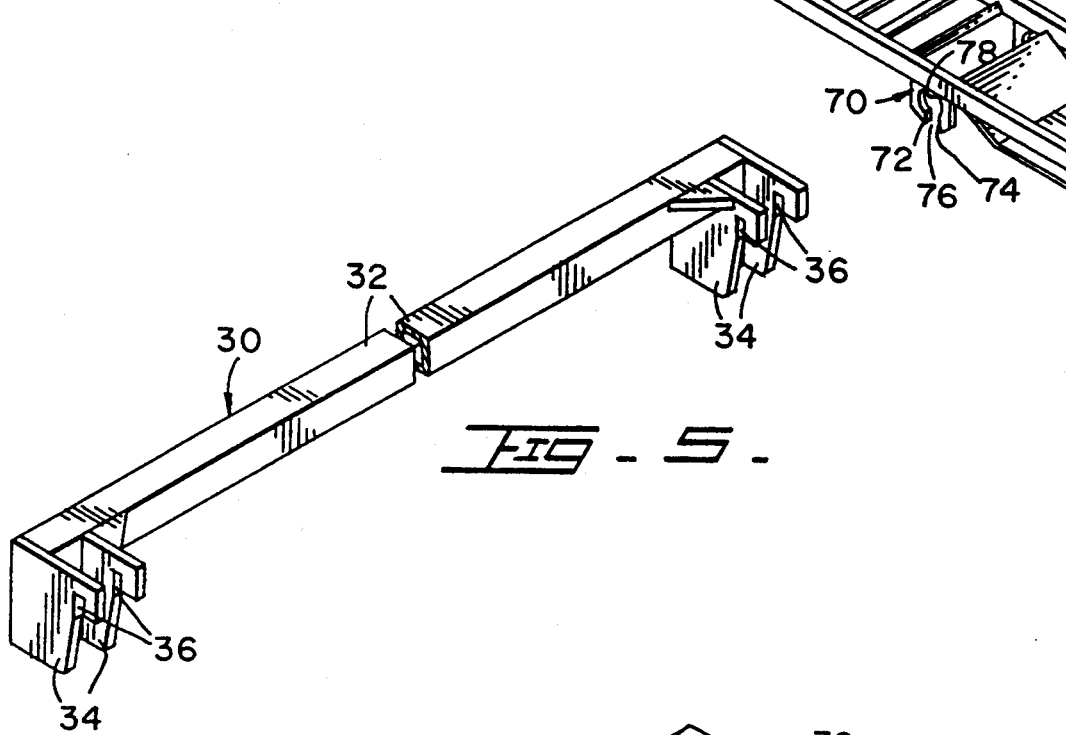
FIG. 5 is an isometric broken view of the crossbar assembly.
Figure 6:
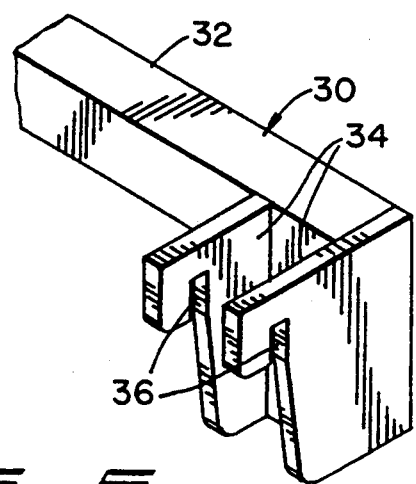
FIG. 6 is an enlarged isometric detail view of the end of one of the crossbar assemblies.

Referring now to FIGS. 1; 5 and 6, it can be seen that cross bar assemblies 30 and 30' are removably mounted to upright assemblies 40; 40'; 140 and 140'. Only front crossbar assembly 30 will be described, however, rear crossbar assembly 30' is similar to front assembly 30. Crossbar assembly 30 comprises crossbar 32, jaw 34 and groove 36. Front crossbar member 30 is removably mounted to, and supported by, upright assemblies 40 and 140. As best seen in FIGS. 1 and 5, jaws 34 and grooves 36 are integral with both ends of bar 32. Jaws 34 are held in a parallel and spaced apart relationship from one another, on bar 32, sufficient to snugly embrace vertical upright member 46. Grooves 36 receive protruding pins 42, which are rigidly mounted at regular intervals on upright member 46 and illustrated in FIGS. 2 and 3, thereby supporting crossbar assembly 30.

Figure 4:
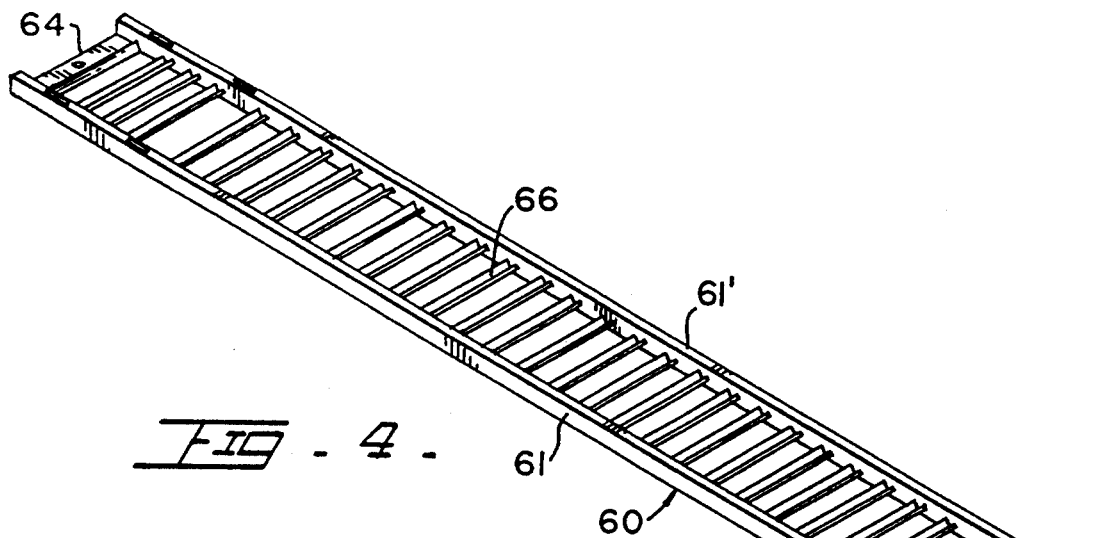
FIG. 4 is a representation of an isometric view of one of the ramp assemblies.

Referring now to FIG. 4 it can be seen that ramp assemblies 60 and 160 includes sides 61 and 61', front end 62, rear end 64, tread support members 66 and wheel well 67. Tread support member 66 and wheel well 67 directly support the weight of any automobile that the user desires to transport. Tread support members 66 and wheel well 67 are rigidly mounted to sides 61 and 61'. Locking mechanisms 70 and 170 are also rigidly mounted to sides 61 and 61'. Sides 61 and 61' are slightly raised and define the edges of a track which assists a driver in steering a vehicle along ramp assemblies 60 and 160.

Figure 2:
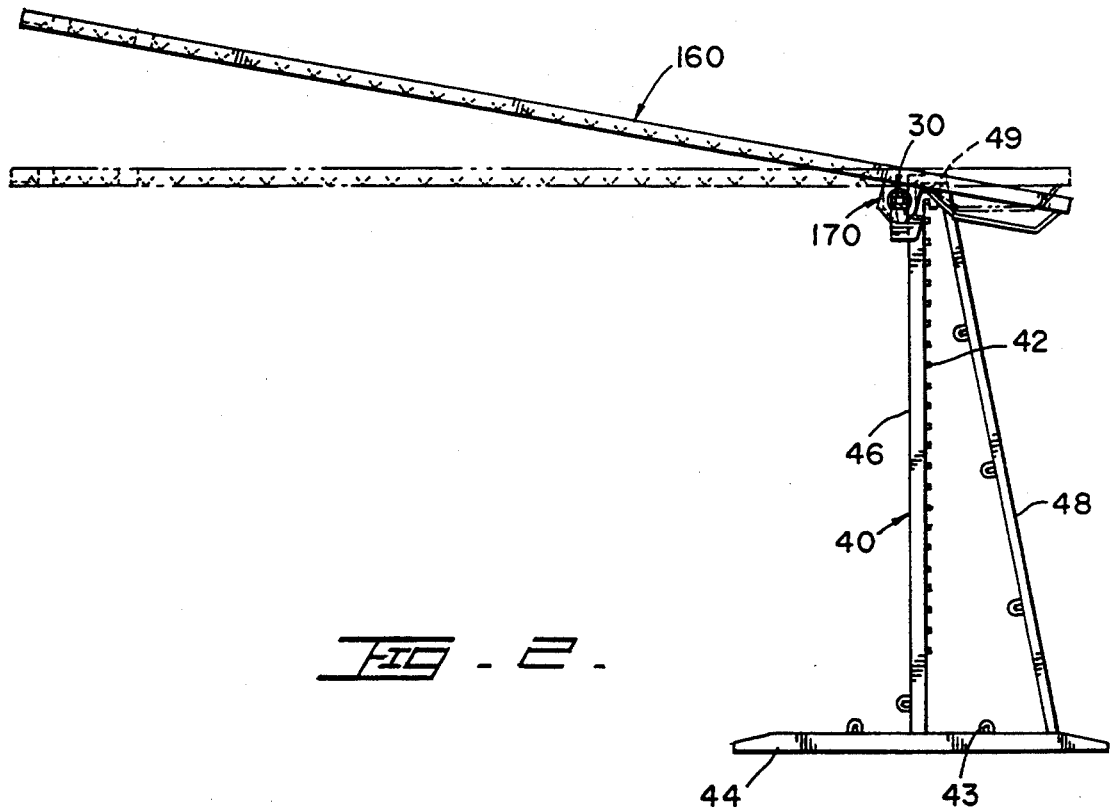
FIG. 2 shows a side elevational view of the ramp assembly raised above the horizontal plane in order to permit the locking assembly to completely engage the crossbar assembly.
Figure 3:
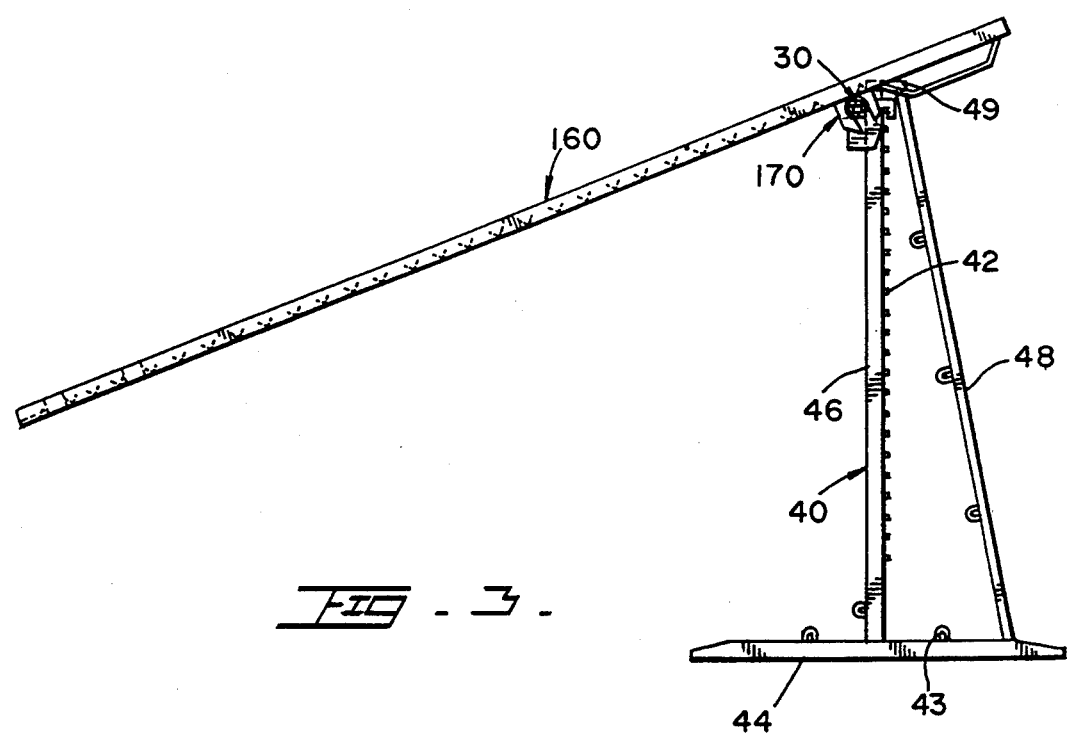
FIG. 3 illustrates a side elevational view of the ramp assembly shown in FIG. 2 but in the lowered position and fully engaged to the crossbar member.

It is apparent from FIGS. 1; 2; 3 and 4 that ramp assemblies 60 and 160 are removably mounted to crossbar assemblies 30 and 30', respectively. As seen in FIGS. 2 and 3, it is apparent that ramp assembly 160 is removably mounted to crossbar assembly 30 by locking assembly 170. Locking assembly 170 is rigidly mounted to sides 61 and 61' of ramp assembly 160 near front end 62 and comprises circular bay 78 and a connecting channel 76, as best seen in FIGS. 4; 8A; 8B and 8C. Channel 76 is defined by opposing sides 72 and 74. In the preferred embodiment, the central and longitudinal axis of channel 76 is set forward approximately ten degrees from the plane defined by ramp assemblies 60 and 160. However, there is a window of between five and twenty degrees over which opposing sides 72 and 74, that define channel 76, can be set forward with similar results. The limiting factor, which prevents channel 76 from being set more than twenty degrees forward, is the height of the ceiling of container C. If a user transports or stores vehicles in a container that does not have a ceiling, channel 76 is not limited to a particular forward set angle, but larger angles are impractical without adding further locking assurance.

When a user mounts ramp assembly 160 on crossbar assembly 30, as it can be seen in FIGS. 2 and 8A, the rear end 64 of the ramp assembly 160 must be elevated above the horizontal until channel 76 (and opposing sides 72 and 74) are aligned with the sides of bar 32. When opposing sides 72 and 74, which define channel 76, are aligned to sides of bar 32, channel 76 slides onto bar 32 which is received into circular bay 78, as seen in FIG. 8B. As best seen in FIGS. 3 and 8C, a user may then lower rear end 64, of ramp assembly 160. Ramp assembly 160 is thereby securely fastened to bar 32 such that it cannot be disengaged without elevating the rear end 64, of ramp assembly 160, above the horizontal. Ramp assembly, 60 is removably mounted to bar 32 in an similar fashion. The rear ends 64, of ramp assemblies 60 and 160, are supported by rear crossbar assembly 30'.

It can also be observed that ramp assemblies 60 and 160 rest in a parallel spaced apart relationship with respect to each other as front ends 62 and rear ends 64 are cooperatively supported by front crossbar 32 and rear crossbar 32', respectively. Typically, two ramp assemblies 60 and 160 will support the four tires of a vehicle. It can also be observed that pivoting movable ramp for transporting automobiles 10 can be placed inside an ordinary shipping container C to allow a user to transport a plurality of vehicles inside a shipping container in a volumetrically efficient way.

Referring now to FIG. 7, it can be seen that device 10 can be assembled in a substantially rectangular shipping container. It is also apparent that the height of ramp assemblies 60 and 160 can be adjusted so that additional vehicles can be stored underneath the vehicle being supported by device 10. This also allows a user to transport or store vehicles in a volumetrically efficient way.

For example, as best seen in FIGS. 1, 4 and 7, a user desiring to transport vehicles $V_1$, $V_2$, $V_3$, $V_4$ inside shipping container C would reverse vehicle $V_1$ into container C, through entrance E, until the rear of vehicle $V_1$ is substantially adjacent to the end of container C opposite entrance E. A user then assembles upright assemblies 40; 140; 40' and 14' of device 10 as described above. Next, also as described above, a user attaches ramp assemblies 60 and 160 to upright assemblies 40; 140; 40' and 140'. A user then drives vehicle $V_2$ into container C through entrance E and onto ramp assemblies 60 and 160 of device 10. In order to achieve the maximum volumetric efficiency, and allow a user to transport vehicles larger than would be possible if ramp assemblies 60 and 160 are mounted horizontally, ramp assemblies 60 and 160 can be positioned such that they are not horizontal with respect to the floor of container C. To position ramp assemblies 60 and 160 so that they are not horizontal, ramp assemblies 60 and 160 are attached such that front end 62 is positioned slightly above the roof of vehicle $V_1$ and rear end 64 is positioned slightly above the hood of vehicle $V_1$. A user then reverses vehicle $V_3$ into container C through entrance E. A user then assembles upright assemblies 40; 140; 40' and 140'. Ramp assemblies 60 and 160 of device 10' are then attached to upright assemblies 40; 140; 40' and 140', in the same fashion that ramps 60 and 160 are attached to device 10 and vehicle $V_4$ is driven onto device 10'. A user may achieve the maximum volumetric efficiency by positioning ramps assemblies 60 and 160 of device 10' such that vehicle $V_4$ is positioned over vehicle $V_3$ in the same manner that vehicle $V_2$ is positioned relative to vehicle $V_1$.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A ramp for transporting and storing vehicles, comprising:
   A. front and rear upright support means;
   B. front and rear crossbar means, said front crossbar means removably mountable to said front upright support means and said rear crossbar means removably mountable to said rear upright support means, said front and rear crossbar means each having first and second ends;
   C. two ramp means for supporting said vehicles having each an underside, first and second ends, and each of said ramp means further including locking means for removably mounting said two ramp means to said front crossbar means and being rigidly mounted to each said underside of said two ramp means, and said second ends of said ramp means being removably supported by said rear crossbar means at selective predetermined locations and wherein said locking means includes an open ended channel connected to a bay and said channel has cooperative dimensions to radially and slidably receive said front crossbar means at a predetermined angle and to lock said two ramp means to said front crossbar means at an angular position different from said angle.

2. The ramp for transporting and storing automobiles as in claim 1 wherein said front and rear cross bar means each further include a jaw integral therewith, said jaw having walls that are held in a spaced apart relationship and define a groove.

3. The ramp for transporting and storing automobiles as in claim 2, wherein said front upright support means has teeth means rigidly mounted at regular intervals thereon, said groove, of said front cross bar means, demountably engaging said teeth means.

4. The ramp for transporting and storing automobiles as in claim 3, wherein said locking means further comprises first and second opposing sides, said channel and said bay, said channel being defined by said opposing sides and said channel being set forward from perpendicular, said channel receiving said front cross bar means and cooperatively guiding said front cross bar means such that said front cross bar means is journal by said bay.

5. The ramp for transporting and storing automobiles as set forth in claim 4 further including a container having a floor on which said front and rear upright support means are mounted.

6. The ramp for transporting and storing automobiles as set forth in claim 5 wherein said front and rear support means each include fastening means for securing said support means to the floor of said container.

* * * * *